US010412285B2

(12) United States Patent
Hu et al.

(10) Patent No.: US 10,412,285 B2
(45) Date of Patent: Sep. 10, 2019

(54) LENS DRIVING MECHANISM

(71) Applicant: TDK TAIWAN CORP., Yangmei Taoyuan (TW)

(72) Inventors: Chao-Chang Hu, Yangmei Taoyuan (TW); Che-Ju Lan, Yangmei Taoyuan (TW); Hung-Chun Chen, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 15/866,409

(22) Filed: Jan. 9, 2018

(65) Prior Publication Data
US 2018/0198962 A1 Jul. 12, 2018

Related U.S. Application Data

(60) Provisional application No. 62/443,948, filed on Jan. 9, 2017.

(30) Foreign Application Priority Data

Nov. 13, 2017 (CN) .......................... 2017 1 1117546

(51) Int. Cl.
H04N 5/225 (2006.01)
G02B 7/09 (2006.01)
H04N 5/232 (2006.01)

(52) U.S. Cl.
CPC ............. *H04N 5/2254* (2013.01); *G02B 7/09* (2013.01); *H04N 5/2253* (2013.01); *H04N 5/23248* (2013.01)

(58) Field of Classification Search
CPC .............. H04N 5/2254; H04N 5/2253; H04N 5/23248; H04N 1/1048; H04N 2201/02431; H04N 2201/02458; H04N 5/23287; G02B 7/09; G02B 7/21; G03B 3/02; G03B 5/02
USPC .................................................. 348/370–374
See application file for complete search history.

(56) References Cited

U.S. PATENT DOCUMENTS

2017/0027812 A1\* 2/2017 Hyde ................... A61H 23/004
2018/0113378 A1\* 4/2018 Wang ................... H04N 5/2258

FOREIGN PATENT DOCUMENTS

TW I578094 B 4/2017

\* cited by examiner

Primary Examiner — Yogesh K Aggarwal
(74) Attorney, Agent, or Firm — Muncy, Geissler, Olds & Lowe, P.C.

(57) ABSTRACT

A lens driving mechanism is provided, including a lens holder, a circuit unit, a driving element, and an integrated circuit element. The lens holder is used for holding a lens. The circuit unit is disposed on a side of the lens holder. The driving element is used for driving the lens holder to move relative to the circuit unit. The integrated circuit element is electrically connected to the driving element and disposed on the circuit unit. The driving element is disposed between the lens holder and the integrated circuit element.

15 Claims, 10 Drawing Sheets

LENS DRIVING MECHANISM

CROSS-REFERENCE TO RELATED APPLICATIONS

The present application claims priority to U.S. Provisional Patent Application No. 62/443,948, filed on Jan. 9, 2017, and China Patent Application No. 201711117546.5 filed on Nov. 13, 2017, which is incorporated by reference herein in its entirety.

BACKGROUND OF THE INVENTION

Field of the Invention

The present invention relates to a lens driving mechanism, and especially to a lens driving mechanism with integrated circuit elements.

Description of the Related Art

Conventional cameras, video recorders, and mobile phones can often collide with objects or be otherwise impacted by external forces during day-to-day use. As a result, their inner optical systems may vibrate and cause a captured image to be blurry. Patent document TW I578094 discloses an optical image stabilization device, wherein its inner coil may interact with a corresponding magnet after passing a current, which allows the lens holder that is secured to the coil to move along the direction of the optical axis of the lens, as well as along a horizontal direction that is perpendicular to the optical axis. This can provide auto focusing (AF) and optical image stabilization (OIS), which help to ensure better image quality. However, in conventional optical image stabilization devices, the integrated circuit element for driving the coils are usually disposed at an external part of the lens driving mechanism. As a result, the volume of the optical image stabilization device may be very large, which can be a disadvantage in the performance tests of the lens driving module and the integrated circuit element.

BRIEF SUMMARY OF THE INVENTION

To overcome these problems, a lens driving mechanism is provided, including a lens holder, a circuit unit, a driving element, and an integrated circuit element. The lens holder is used for holding a lens. The circuit unit is disposed on a side of the lens holder. The driving element is used for driving the lens holder to move relative to the circuit unit. The integrated circuit element is electrically connected to the driving element and disposed on the circuit unit. The driving element is disposed between the lens holder and the integrated circuit element.

In an embodiment, the integrated circuit element is disposed at a corner of the circuit unit.

In an embodiment, the lens driving mechanism further includes a filter element disposed at the corner of the circuit unit.

In an embodiment, the driving mechanism further includes a sensing element disposed on the circuit unit.

In an embodiment, the sensing element is integrated in the integrated circuit element.

In an embodiment, the lens holder defines a quadrilateral area, and the lens driving mechanism further includes a plurality of coils and magnetic elements, wherein the magnetic elements correspond to the coils and are disposed at at least two sides of the quadrilateral area.

In an embodiment, the lens holder defines a quadrilateral area, and the lens driving mechanism further includes a plurality of coils and magnetic elements, wherein the magnetic elements correspond to the coils and are disposed at at least two corners of the quadrilateral area.

In an embodiment, the lens driving mechanism further includes a base disposed on one side of the circuit unit, and the base has a receiving space for receiving the integrated circuit element.

In an embodiment, the receiving space is filled with a glue to connect the integrated circuit element and the base.

In an embodiment, the base has an outer portion, and the thickness of the outer portion is greater than that of the integrated circuit element.

In an embodiment, the driving element and the circuit unit are integrated as a single structure.

In an embodiment, the circuit unit comprises a first signal layer, a second signal layer and a ground layer, and the ground layer is located between the first signal layer and the second signal layer.

In an embodiment, the first signal layer and the second signal layer are used for respectively transferring an analog signal and a digital signal.

In an embodiment, the circuit unit substantially includes a quadrilateral structure, the quadrilateral structure is divided into two triangular regions, and the triangular regions are respectively used for delivering an analog signal and a digital signal.

In an embodiment, the lens driving mechanism further includes a base, and the circuit unit, the integrated circuit element and the base are integrated as one piece by semiconductor embedded substrate technology.

DETAILED DESCRIPTION OF THE INVENTION

Hereinafter, the embodiment of present invention will be described with attached figures.

The abovementioned and other technical contents, features and effects relating to the present invention are clearly shown in the description of a preferred embodiment with reference figures. The directional phrases, such as on, under, left, right, front or rear are the directions relative to the reference figures. As a result, the directional phrases are only for illustration and is not intended to restrict this invention.

Figure 1A:
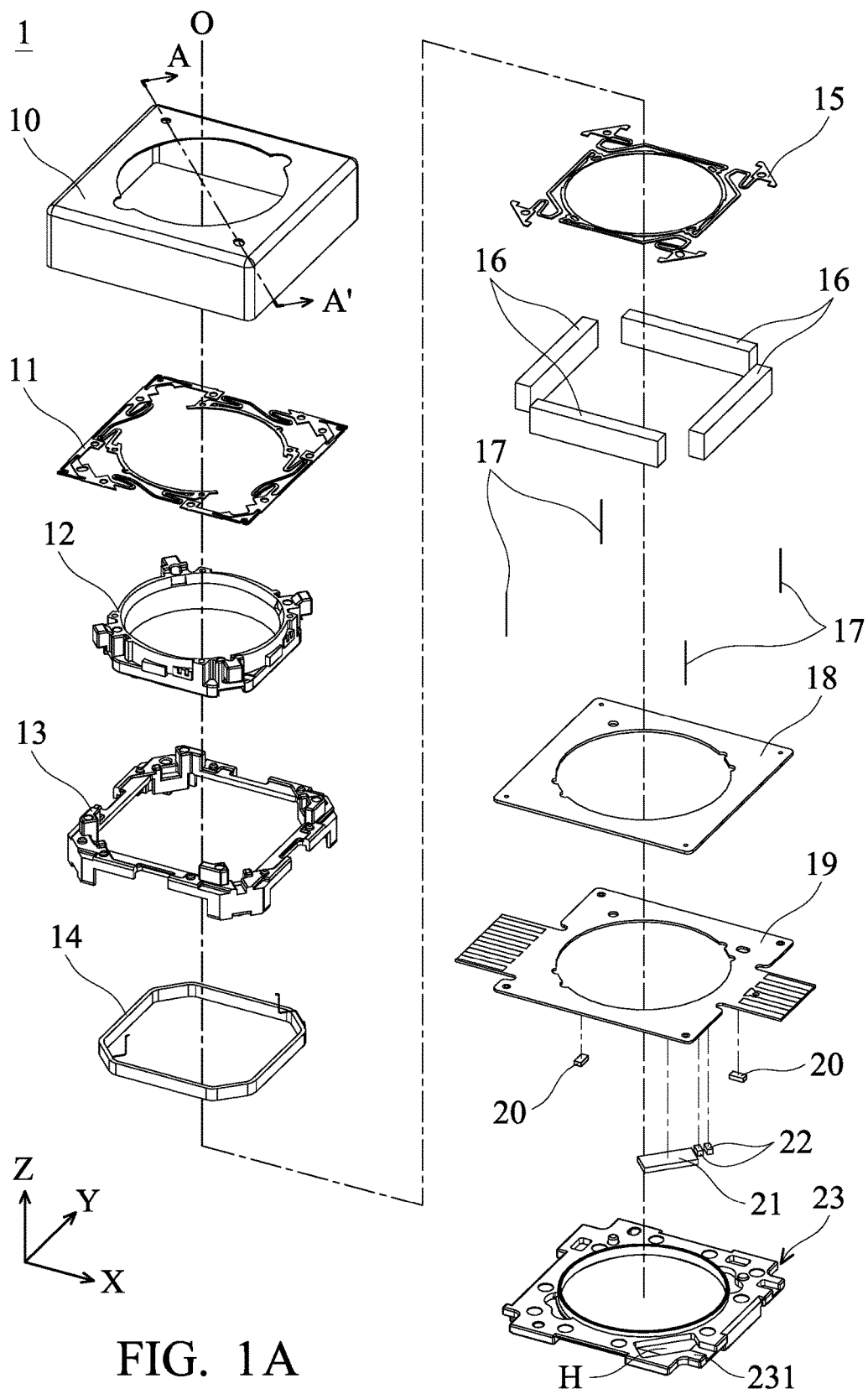
FIG. 1A is an exploded view of a lens driving mechanism in an embodiment of the present invention.
Figure 1B:
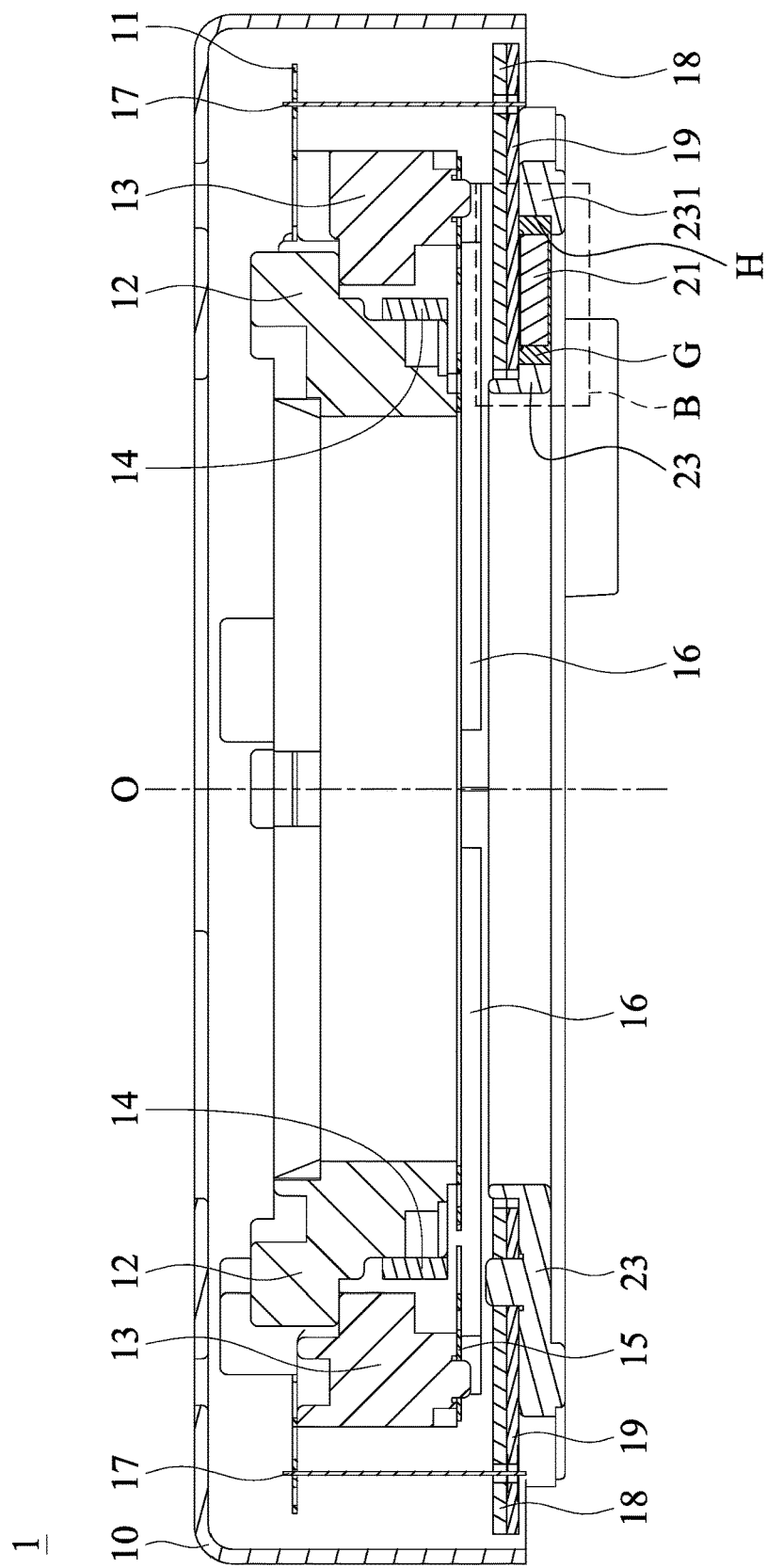
FIG. 1B is a cross-sectional view along line A-A' of the lens driving mechanism of FIG. 1A after being combined.

Referring to FIGS. 1A and 1B. In an embodiment of the present invention, a lens driving mechanism 1 may be disposed, for example, in a camera (or an electronic device with photographing function) to hold a lens, and it may be used to prevent or to suppress the problem of the image captured blurring caused from the camera vibration. It can be figured out from FIGS. 1A and 1B that the lens driving mechanism mainly includes a case 10, a first spring 11, a lens holder 12, a frame 13, a driving element 14, a second spring 15, at least a magnetic element 16, at least a suspension wire 17, a driving element 18, a circuit unit 19, at lease a sensing element 20, an integrated circuit element 21, at least a filter element 22 and a base 23, wherein the case 10 and the base 23 form a hollow structure for receiving the other elements. The driving element 14 is, for example, a coil wounding around the outer surface of the lens holder 12. After passing current, a magnetic field repulsing or attracting the magnetic element 16 may be generated by the driving element 14 to drive the lens holder 12 and a lens therein (not shown) moving toward the optical axis O direction for focusing. The lens holder 12 is movably disposed in the hollow structure composed of the case 10 and the base 23, the lens holder 12 and frame 13 are connected by the first spring 11 and the second spring 15, and the first spring 11 and the circuit unit 19 are connected by the suspension wire 17. It should be noted that another image sensor (e.g. CCD, not shown) is disposed below the base 23 and corresponds to the lens in the lens holder 12. The integrated circuit 21 may receive a sensing signal from the sensing element 20 and provide a driving signal to a coil (not shown) which is in the driving element 18 and corresponds to the magnetic element 16 according to the sensing signal. As a result, the frame 13, lens holder 12 and the lens therein may be moved by the magnetic force along a horizontal direction relative to the base 23 to instantly revise the offset of the lens along X-axis direction or Y-axis direction, and thus achieving optical image stabilization and acquiring better image quality.

As shown in FIGS. 1A and 1B, the circuit unit 19 is disposed under the lens holder 12, and the driving element 18 with a coil disposed therein is located between the lens holder 12 and the integrated circuit element 21, wherein the integrated circuit element 21 may be electrically connected to the driving element 18 through the circuit unit 19, and the lens holder 12 may be moved relative to the circuit unit 19 by the driving element 18. In another embodiment, the driving element 18 may also be integrated with the circuit unit 19 as a single structure. It can be figured out from FIG. 1B that the integrated circuit element 21 is disposed on a side of the circuit unit 19 which is adjacent to the base 23. However, the integrated circuit element 21 may also be disposed on a side of the circuit unit 19 which is far from the base 23. In other words, the integrated circuit element 21 only has to be disposed on the circuit unit 19, and is not limited by the embodiments.

In this embodiment, the circuit unit 19 may be a flexible printed circuit (FPC), printed circuit board (PCB) or a molded interconnect device (MID), which is to form a 3-dimensional circuit and an interconnect device on a molded surface. For example, using laser direct structuring (LDS) to form a circuit structure on the base, which is directly using a laser to transfer a circuit pattern to the surface of a molded element, but it is not limited thereto. It should be noted that in this embodiment, the integrated circuit element 21 is disposed on the circuit unit 19 to allow the integrated circuit element 21 may be integrated in the lens driving mechanism 1 to reduce the volume of the optical system. Furthermore, the performance tests of the driving mechanism and the integrated circuit element may be performed together without connecting to circuits at the outside of the lens driving mechanism 1.

Figure 2A:
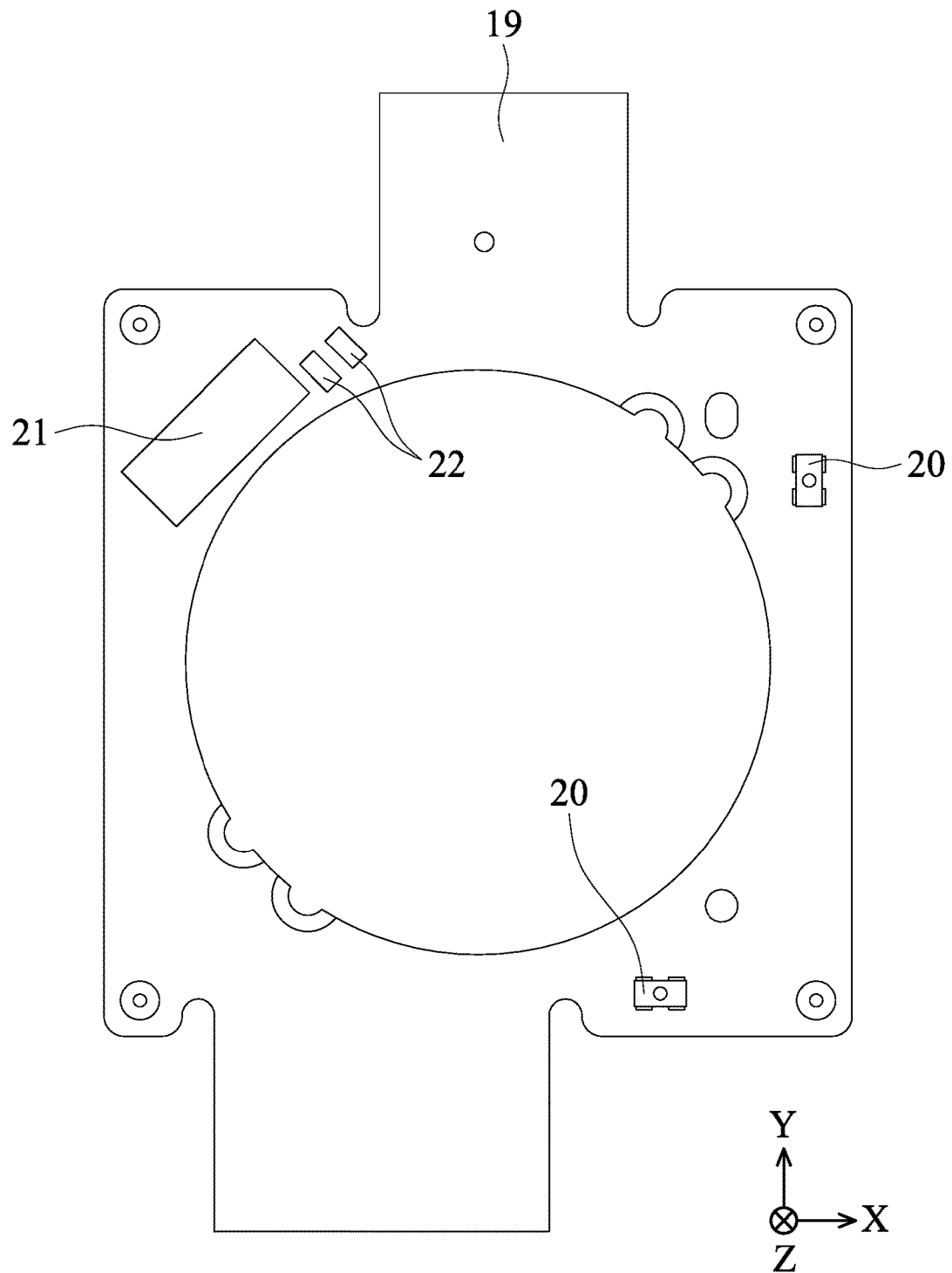
FIG. 2A is a bottom view of the circuit unit, integrated circuit element, filter elements and sensing elements in FIG. 1A after being combined.

FIG. 2A is a bottom view of the circuit unit 19, sensing elements 20, integrated circuit element 21 and the filter elements 22 in FIG. 1A after being combined. It can be figured out from FIG. 2A that the integrated circuit element 21 is located at a corner of the circuit unit 19, so the space at the corner may be effectively utilized. On the other hand, the filter element 22 is disposed adjacent to the integrated circuit element 21 to further enhance the function of noise filtering of the filter element 22, wherein the filter element 22 may be a capacitor, but is not limited thereto. Furthermore, the two sensing elements 20 are respectively disposed on two sides of the circuit unit 19 which are perpendicular to each other to respectively detect the movement of the lens holder 12 along X-axis direction and Y-axis direction relative to the base 23. The sensing element may be a Hall sensor, an MR sensor, a fluxgate or an optical encoder, but is not limited thereto.

Figure 2B:
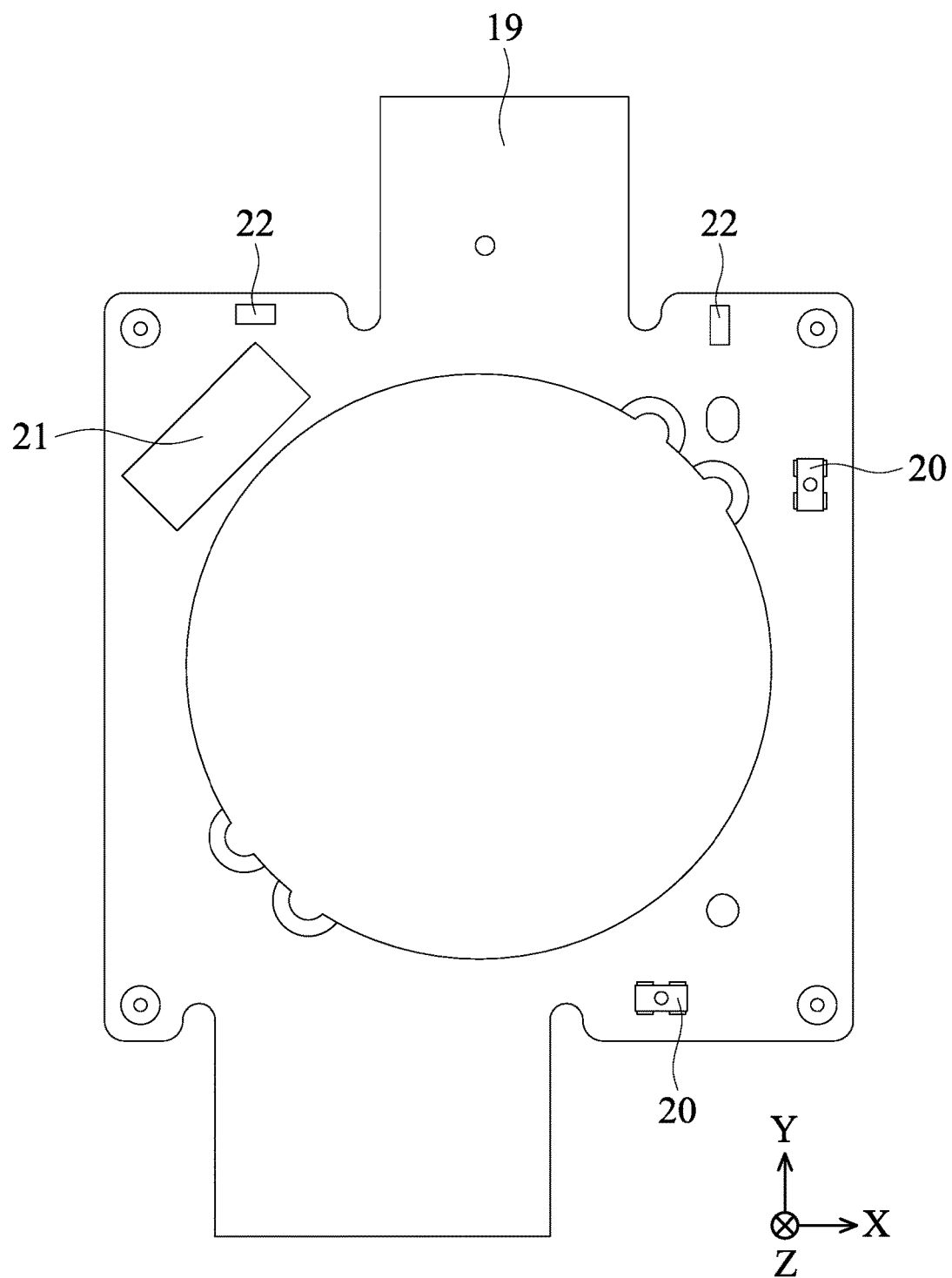
FIG. 2B is a bottom view of the circuit unit, integrated circuit element, filter elements and sensing elements after being combined, according to another embodiment of the present invention.

Referring to FIG. 2B, which is a bottom view of the circuit unit 19, the sensing element 20, the integrated circuit element 21 and the filter elements 22 after being combined, according to another embodiment of the present invention. The difference between this embodiment and the embodiment in FIG. 2A is that not all of the filter elements 22 are disposed adjacent to the integrated circuit element 21, but the filter elements 22 are respectively disposed on different corners of the circuit unit 19.

Figure 2C:
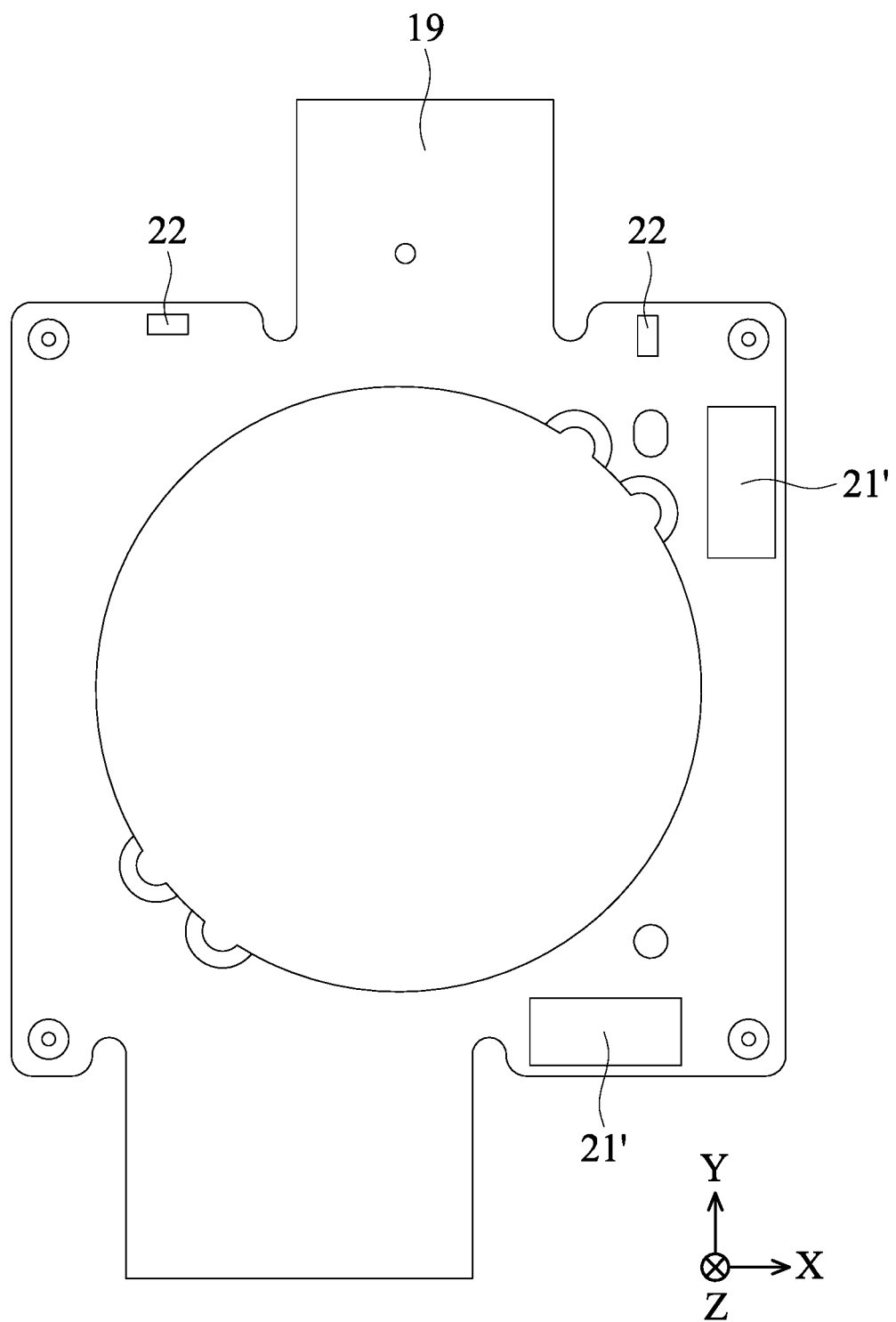
FIG. 2C is a bottom view of the circuit unit, integrated circuit elements and filter elements after being combined, according to another embodiment of the present invention.

Referring to FIG. 2C, which is a bottom view of the circuit unit 19, the integrated circuit elements 21' and the filter elements 22 of another embodiment of the present invention after being combined. It should be noted that the sensing elements 20 are integrated in the integrated circuit elements 21' in this embodiment, and the two integrated circuit elements 21' having sensing function are respectively disposed on two sides of the circuit unit 19 which are perpendicular to each other. As a result, the movement of the lens holder 12 along X-axis direction and Y-axis direction relative to the base 23 may be respectively detected, and the volume of the lens driving mechanism 1 may be further reduced. In those embodiments, the sensing elements 20, integrated circuit elements 21 and 21' and filter elements 22 are disposed on the circuit unit 19 for integrating the circuit elements for driving the driving element 18 in the lens driving mechanism 1 to reduce the volume of the optical system, and is beneficial for performing the performance tests of the driving mechanism and the integrated circuit element together.

Figure 3A:
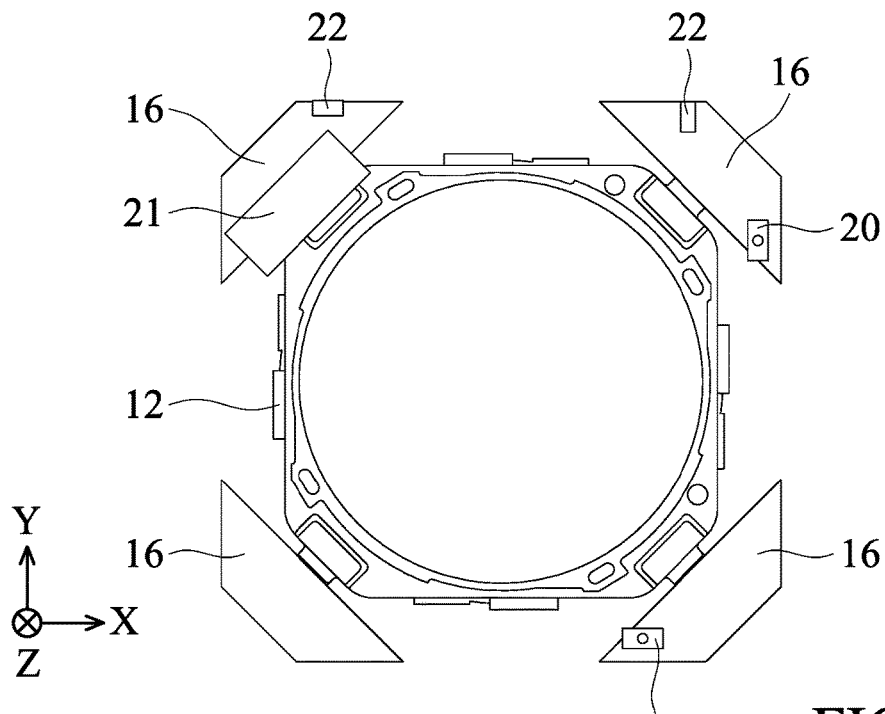
FIG. 3A is a bottom view of the lens holder, magnetic elements, integrated circuit element, filter elements and sensing elements in FIG. 1A after being combined.

FIG. 3A is a bottom view of the relative position relationship of the lens holder 12, magnetic elements 16, sensing elements 20, integrated circuit element 21 and the filtering elements 22 in FIG. 1A after being combined. In this embodiment, when viewing from Z-axis direction, a quadrilateral area is substantially defined by the lens holder 12, wherein the four magnetic elements 16 are respectively disposed at four corners of the quadrilateral area and correspond to a plurality of coils in the driving element 18. Furthermore, it can be figured out from FIG. 3A that the sensing elements 20, the integrated circuit element 21 and the filtering elements 22 are also located at the corners of the quadrilateral area and at least partially overlapping with the magnetic elements 16 along Z-axis direction. It should be noted that in an embodiment, it is available to only dispose two magnetic elements 16 corresponding to different coils in the driving element 18, and the magnetic elements 16 are respectively disposed at two corners of the rectangle area, but is not limited thereto.

Figure 3B:
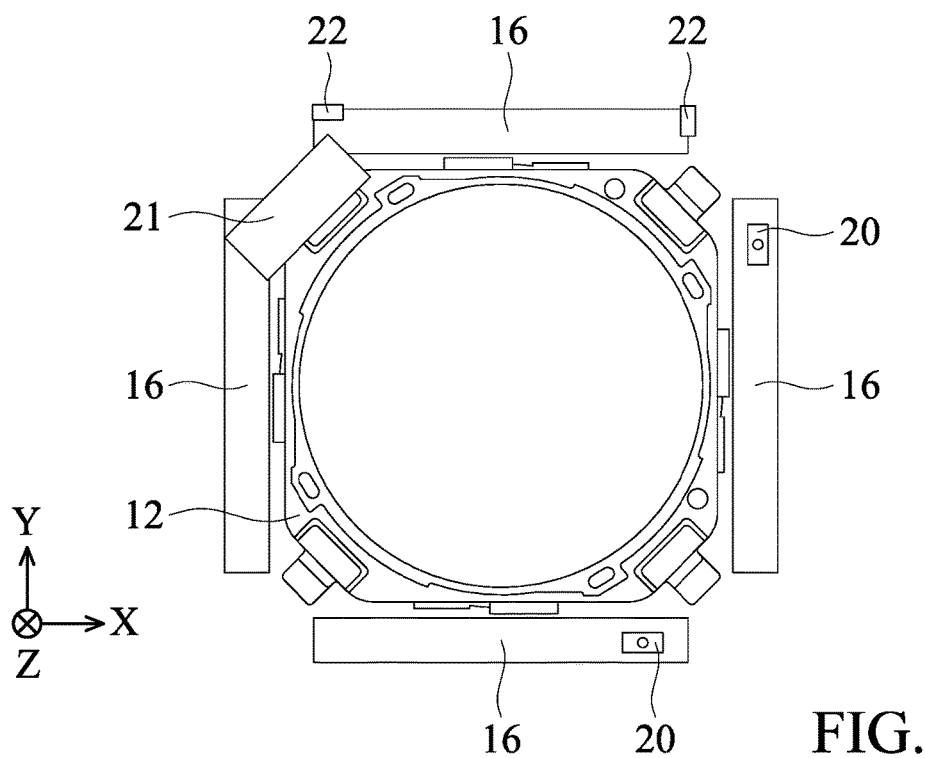
FIG. 3B is a bottom view of lens holder, magnetic elements, integrated circuit element, filter elements and sensing elements after being combined, according to another embodiment of the present invention.

However, the magnetic elements 16 may be disposed in a different manner. As shown in FIG. 3B, the four magnetic elements 16 are respectively disposed at four sides of the quadrilateral area and correspond to the plurality of coils in the driving element 18 when viewing from the Z-axis direction in this embodiment. Furthermore, it can be further figured out from FIG. 3B that the sensing elements 20, integrated circuit element 21 and the filtering elements 22 are at least overlapping with the ends of the magnetic elements 16 along Z-axis direction. It should be noted that it is available to only dispose two magnetic elements 16 corresponding to different coils in the driving element 18, and the magnetic elements 16 are respectively located on two sides of the quadrilateral area in an embodiment, but is not limited thereto.

Figure 4A:
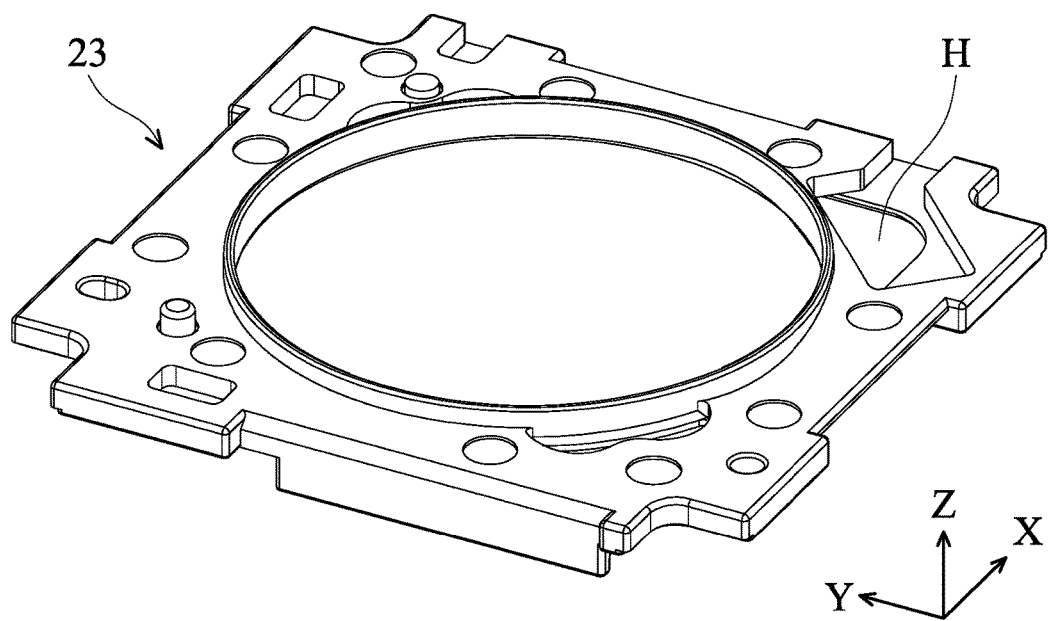
FIG. 4A is a schematic view of the base in FIG. 1A.
Figure 4B:
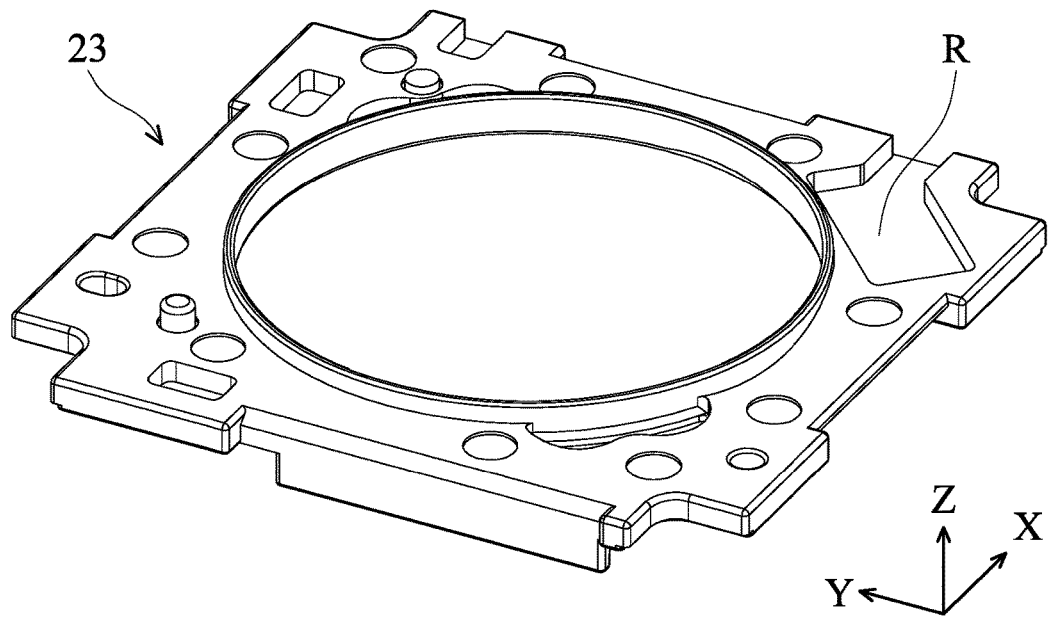
FIG. 4B is a schematic view of the base in another embodiment of the present invention.

Referring to FIG. 4A, which is a schematic view of the base 23 in FIG. 1A. In this embodiment, the integrated circuit element 21 is disposed at one side of the circuit unit 19 adjacent to the base 23. As a result, a through hole H is formed at the corner of the base 23 corresponding to where the integrated circuit element 21 is disposed. Therefore, a receiving space for receiving the integrated circuit element 21 is formed, the thickness of the lens driving mechanism 1 may be reduced, and the integrated circuit element 21 may be prevented from colliding with other inner parts to reduce the possibility of malfunction. FIG. 4B is a schematic view of the base 23 in another embodiment of the present invention, wherein the difference to the embodiment of FIG. 4A is that a recess R is formed at the corner of the base 23 to accommodate the integrated circuit element 21. As a result, the thickness of the lens driving mechanism 1 may be reduced, and the structural strength of the base 23 may be maintained.

Figure 5A:
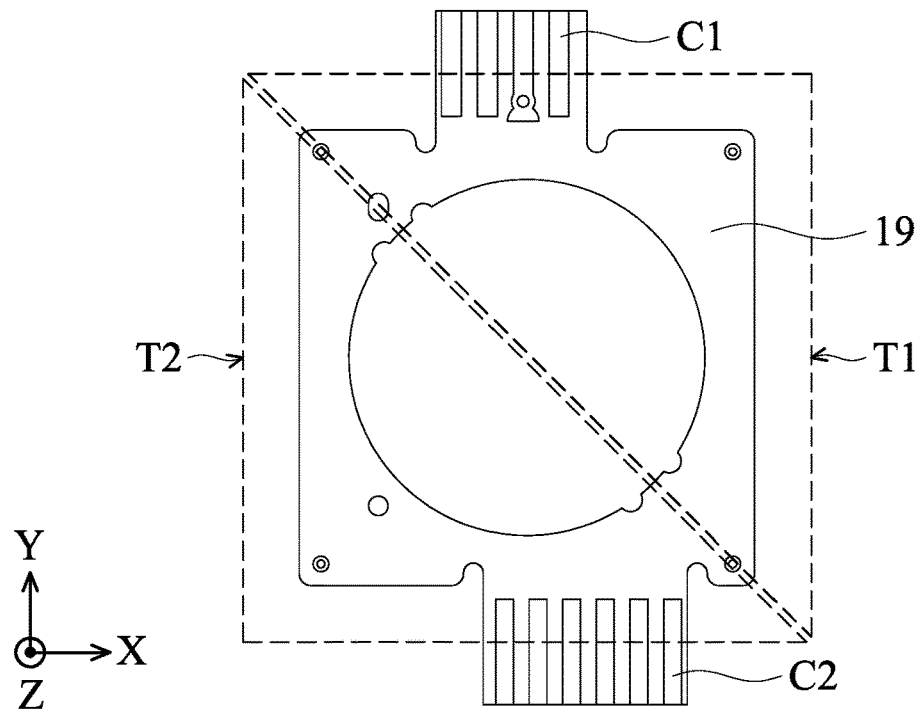
FIG. 5A is a schematic view of the circuit unit in FIG. 1A.

Referring to FIG. 5A, which is a schematic view of the circuit unit 19 in FIG. 1A. It can be figured out from FIG. 5A that the circuit unit 19 substantially has a quadrilateral structure, and may be divided into two triangular areas T1 and T2. The two triangular areas T1 and T2 may respectively transport analog and digital signals to avoid the interference between the analog and digital signals, which may affect the performance of the lens driving mechanism 1. In this embodiment, a terminal C1 for transferring electricity and a terminal C2 for transferring control signal are respectively located at opposite sides of the quadrilateral structure, the terminal C1 for transferring electricity connects circuits in the triangular area T1, and the terminal C2 for transferring control signal connects circuits in the triangular area T2. As a result, it can be promised that the circuits in the triangular areas T1 and T2 may not affect each other, and the stability of signal transmission may be enhanced.

Figure 5B:
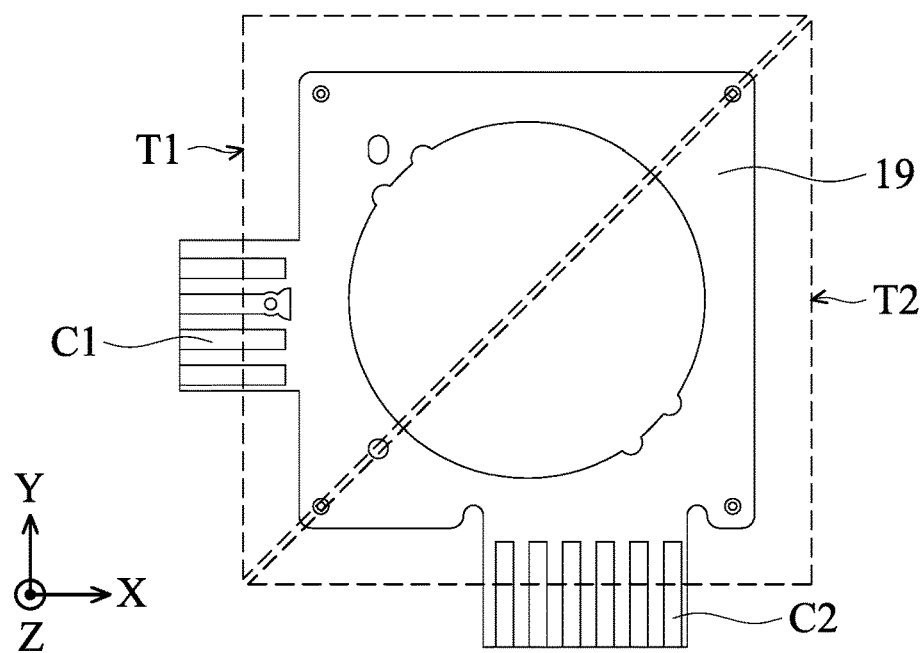
FIG. 5B is a schematic view of the circuit unit in another embodiment of the present invention.

On the other hand, as shown in FIG. 5B, in the circuit unit 19, the terminal C1 for transferring electricity and the terminal C2 for transferring control signal may also respectively locate at two sides of the quadrilateral structure which are adjacent and perpendicular to each other, according to another embodiment of the present invention.

Figure 6:
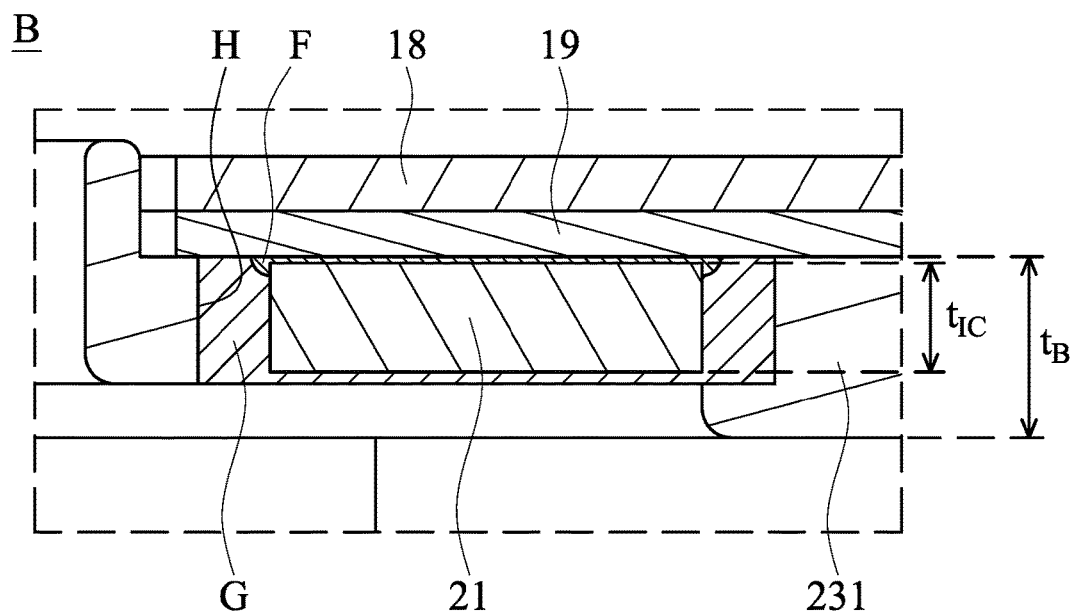
FIG. 6 is an enlarged view of the marked portion B in FIG. 1B.

FIG. 6 is an enlarged view of the marked portion B in FIG. 1B. It can be figured out from FIG. 6 that the integrated circuit element 21 is disposed in a through hole H of the base 23, an underfill F is filled between the integrated circuit element 21 and the circuit element 19, a receiving space is formed between the inner wall of the through hole H of the base 23 and the integrated element 21, and a glue G is filled in the receiving space for connecting the integrated circuit element 21 and the base 23 to avoid the integrated circuit element 21 from falling off. For example, if an element which easily generates heat is disposed adjacent to the integrated circuit element 21, the glue G may stop the heat from being conducted to the integrated circuit element 21. Furthermore, the through hole H may be completely covered by the glue G and the underfill F, so a foreign body may be prevented from entering through the lens driving mechanism 1. In this embodiment, the reliability of the lens driving mechanism 1 may be significantly enhanced by disposing the glue G and the underfill F.

Referring to FIGS. 1A, 1B and 6. In this embodiment, the base 23 has an outer portion 231, and the thickness $t_B$ of the outer portion 231 is greater than the thickness $t_{IC}$ of the integrated circuit element 21. As a result, much more comprehensive protection may be provided to the integrated circuit element 21.

Figure 7:
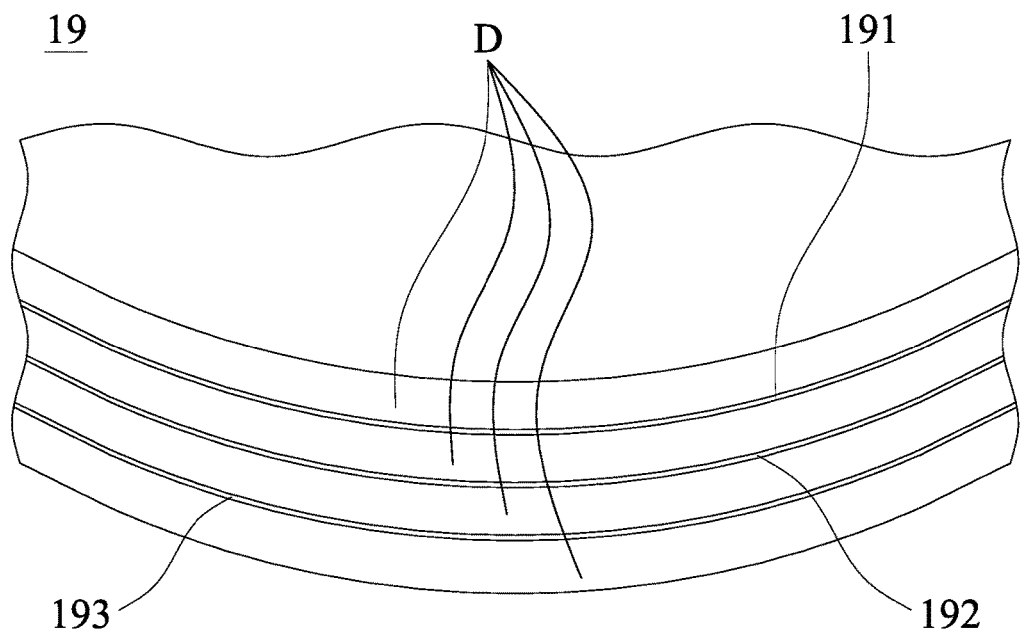
FIG. 7 is a 3-dimensional partial enlarged view of the circuit unit in FIG. 1A.

FIG. 7 is a 3-dimensional partial enlarged view of the circuit unit 19 in FIG. 1A. It can be figured out from FIG. 7 that a first signal layer 191, a ground layer 192 and a second signal layer 193 are disposed between a plurality of insulating layers D, wherein the first signal layer 191 and the second signal layer 193 are used for respectively transferring analog and digital signals. The ground layer 192 is located between the first signal layer 191 and the second signal layer 193, and the interference between the first signal layer 191 and the second signal layer 193 may be insulated by the ground layer 192 to enhance the electrical performance of the lens driving mechanism 1.

Figure 8:
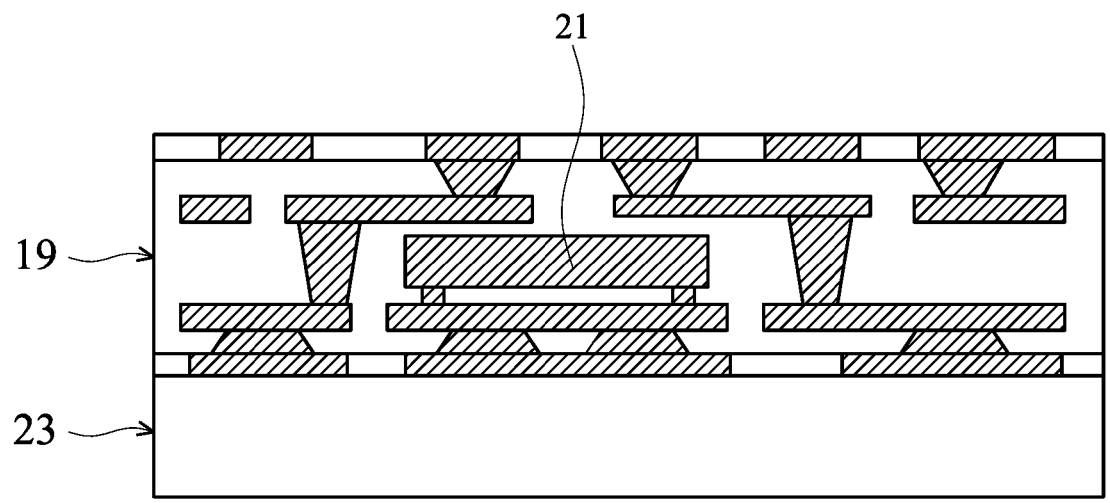
FIG. 8 is a schematic view of the circuit unit, integrated circuit element and the base using semiconductor embedded in substrate (SESUB) technology to be integrally formed as one piece, accordance with another embodiment of the present invention.

Referring to FIG. 8, the circuit unit 19, integrated circuit element 21 and the base 23 may be integrally formed as one piece by semiconductor embedded in substrate (SESUB) technique in another embodiment of the present invention. In this embodiment, the circuit unit 19, integrated circuit element 21 and the base 23 may be integrated by the SESUB technique to significantly reduce the thickness of the lens driving mechanism 1.

In conclusion, the integrated circuit element 21 is mainly disposed on the circuit unit 19 in the lens driving mechanism 1 in the present invention, so the integrated circuit element 21 for performing optical image stabilization is integrated in the lens driving mechanism 1. As a result, the volume of the optical system may be reduced, and the performance tests of the driving mechanism and the integrated circuit element may be performed together.

The description above is only embodiments of the present the disclosure, and should not be used to limit the present disclosure. For a person skilled in the art, various changes and variations may be included in the present disclosure. The features of the embodiments may be used together and depend on the requirements, and is not limited. Any variation, equivalent replacement and improvement in the spirit and principle of the present disclosure should be protected in the present disclosure.

What is claimed is:

1. A lens driving mechanism, comprising:
   a lens holder for holding a lens;
   a circuit unit disposed at a side of the lens holder;
   a driving element for driving the lens holder to move relative to the circuit unit;
   an integrated circuit element electrically connected to the driving element, wherein the integrated circuit element is disposed on the circuit unit, and the driving element is disposed between the lens holder and the integrated circuit element; and
   a base disposed on one side of the circuit unit, wherein the base has an outer portion and a receiving space for receiving the integrated circuit element, and the thickness of the outer portion is greater than that of the integrated circuit element.

2. The lens driving mechanism as claimed in claim 1, wherein the integrated circuit element is disposed at a corner of the circuit unit.

3. The lens driving mechanism as claimed in claim 2, wherein the lens driving mechanism further comprises a filter element disposed at the corner of the circuit unit.

4. The lens driving mechanism as claimed in claim 1, wherein the driving mechanism further comprises a sensing element disposed on the circuit unit.

5. The lens driving mechanism as claimed in claim 4, wherein the sensing element is integrated in the integrated circuit element.

6. The lens driving mechanism as claimed in claim 1, wherein the lens holder defines a quadrilateral area, and the lens driving mechanism further comprises a plurality of coils and magnetic elements, wherein the magnetic elements correspond to the coils and are disposed at least two sides of the quadrilateral area.

7. The lens driving mechanism as claimed in claim 1, wherein the lens holder defines a quadrilateral area, and the lens driving mechanism further comprises a plurality of coils and magnetic elements, wherein the magnetic elements correspond to the coils and are disposed at least two corners of the quadrilateral area.

8. The lens driving mechanism as claimed in claim 1, wherein the receiving space is filled with a glue to connect the integrated circuit element and the base.

9. The lens driving mechanism as claimed in claim 1, wherein the driving element and the circuit unit are integrated as a single structure.

10. The lens driving mechanism as claimed in claim 1, wherein the circuit unit comprises a first signal layer, a second signal layer and a ground layer, and the ground layer is located between the first signal layer and the second signal layer.

11. The lens driving mechanism as claimed in claim 10, wherein the first signal layer and the second signal layer are used for respectively transferring an analog signal and a digital signal.

12. The lens driving mechanism as claimed in claim 1, wherein the circuit unit substantially comprises a quadrilateral structure, the quadrilateral structure is divided into two triangular regions, and the triangular regions are respectively used for delivering an analog signal and a digital signal.

13. The lens driving mechanism as claimed in claim 1, wherein the lens driving mechanism further comprises a base, and the circuit unit, the integrated circuit element and the base are integrated as one piece by semiconductor embedded substrate technology.

14. A lens driving mechanism, comprising:
    a lens holder for holding a lens;
    a circuit unit disposed at a side of the lens holder and comprising a first signal layer, a second signal layer and a ground layer;
    a driving element for driving the lens holder to move relative to the circuit unit; and
    an integrated circuit element electrically connected to the driving element, wherein the integrated circuit element is disposed on the circuit unit, and the driving element is disposed between the lens holder and the integrated circuit element, wherein the ground layer is located between the first signal layer and the second signal layer, and the first signal layer and the second signal layer are used for respectively transferring an analog signal and a digital signal.

15. A lens driving mechanism, comprising:
    a lens holder for holding a lens;
    a circuit unit disposed at a side of the lens holder;
    a driving element for driving the lens holder to move relative to the circuit unit; and
    an integrated circuit element electrically connected to the driving element, wherein the integrated circuit element is disposed on the circuit unit, and the driving element is disposed between the lens holder and the integrated circuit element, wherein the circuit unit substantially comprises a quadrilateral structure, the quadrilateral structure is divided into two triangular regions, and the triangular regions are respectively used for delivering an analog signal and a digital signal.

* * * * *